(12) United States Patent
Nian

(10) Patent No.: US 9,753,215 B2
(45) Date of Patent: Sep. 5, 2017

(54) BACKLIGHT, LIQUID CRYSTAL MODULE AND DISPLAY DEVICE

(71) Applicants: BOE TECHNOLOGY GROUP CO., LTD., Beijing (CN); Xiamen Boe Electronics Co., Ltd., Xiamen (CN)

(72) Inventor: Changxin Nian, Beijing (CN)

(73) Assignees: BOE TECHNOLOGY GROUP CO., LTD., Beijing (CN); XIAMEN BOE ELECTRONICS CO. LTD., Xiamen (CN)

( * ) Notice: Subject to any disclaimer, the term of this patent is extended or adjusted under 35 U.S.C. 154(b) by 160 days.

(21) Appl. No.: 14/803,553

(22) Filed: Jul. 20, 2015

(65) Prior Publication Data

US 2016/0091659 A1    Mar. 31, 2016

(30) Foreign Application Priority Data

Sep. 29, 2014    (CN) .................... 2014 2 0567903 U

(51) Int. Cl.
*G02F 1/1333*    (2006.01)
*G02F 1/1335*    (2006.01)
*F21V 8/00*    (2006.01)

(52) U.S. Cl.
CPC .................. *G02B 6/0088* (2013.01)

(58) Field of Classification Search
CPC ... G02F 1/133308; G02F 2001/133314; G02F 1/133615; G02F 2001/133317; G02F 2001/133328; G02B 6/0088; G02B 6/0055; G02B 6/009; G02B 6/0091

USPC .............................. 349/58–61; 362/611, 633
See application file for complete search history.

(56) References Cited

U.S. PATENT DOCUMENTS

| | | | |
|---|---|---|---|
| 7,868,971 B2* | 1/2011 | Zensai .............. | G02F 1/133608 349/58 |
| 8,113,704 B2* | 2/2012 | Bae ........................ | G02B 6/008 349/61 |
| 2013/0107157 A1* | 5/2013 | Yang .................. | G02F 1/133308 349/58 |
| 2016/0187557 A1* | 6/2016 | Zhang .................... | G02B 6/009 362/606 |

* cited by examiner

*Primary Examiner* — Huyen Ngo
(74) *Attorney, Agent, or Firm* — Calfee, Halter & Griswold LLP

(57) ABSTRACT

This disclosure provides a backlight comprising an optical component and a frame that comprises a receiving part, said optical component being disposed in said receiving part, said optical component comprising a reflective sheet for reflecting light towards a light exit of the backlight, said reflective sheet comprising a reflective sheet body and a lug arranged on at least one side of the reflective sheet body, said lug protruding outwardly of the reflective sheet body along a length or a width direction of the reflective sheet body, a clamp slot corresponding to the lug being arranged on a side wall of said receiving part, said lug being arranged within the clamp slot. Correspondingly, this disclosure provides also a liquid crystal module and a display device. Compared with the prior art, during repair and maintenance, the backlight of this disclosure avoids the damage to the reflective sheet caused by tearing double-sided adhesive and avoids waste of the double-sided adhesive, thereby reducing the manufacturing cost.

8 Claims, 2 Drawing Sheets

BACKLIGHT, LIQUID CRYSTAL MODULE AND DISPLAY DEVICE

RELATED APPLICATIONS

The present application claims the benefit of Chinese Patent Application No. 201420567903.3, filed on Sep. 29, 2014, the entire disclosure of which is incorporated herein by reference.

FIELD

This disclosure relates to the display technical field and, in particular, to a backlight as well as a liquid crystal module comprising the backlight and a display device.

BACKGROUND

Backlights for a liquid crystal display device are divided into two types: direct-lit and edge-lit types, of which a display device with an edge-lit backlight can have a smaller thickness. In an edge-lit backlight, such optical film sheets as a light guide plate, a reflective sheet and a diffusion plate above the light exit surface of the light guide plate are included. A light emitting means emit light rays towards a light incidence surface of the light guide plate, where the light guiding function of the light guide plate enables an area light source to be formed by point light sources. The reflective sheet is arranged at a bottom surface of the light guide plate, for reflecting the light leaked from the bottom surface of the light guide plate so as to enhance the light utilization. For the prior art to fix the reflective sheet, most frequently used is attaching a part of the back side of the reflective sheet 1 to a circuit board 3 of a light bar by using a double-sided adhesive 2 (as shown in FIG. 1), or attaching it to the back plate of the backlight. However, in such methods during the attaching, it is not easy for the reflective sheet 1 to get aligned; in addition, the reflective sheet 1 needs to be torn during repair and maintenance, where since the reflective sheet 1 is of a flexible material, the tearing of the reflective sheet 1 would result in an undesirability such as folding prints in the appearance of the reflective sheet 1, and further, as the reflective sheet 1 has been disassembled, the double-sided adhesive 2 loses its adhesiveness and could not be recycled for second-time uses, which leads to a waste of resources.

SUMMARY

It is an object of this disclosure to provide a backlight, a liquid crystal module and a display device for facilitating assembling as well as repairing and maintenance of the backlight.

In order to achieve this object, the first aspect of this disclosure provides a backlight comprising an optical component and a frame that comprises a receiving part, said optical component being disposed within said receiving part, said optical component comprising a reflective sheet for reflecting light towards a light exit of the backlight, said reflective sheet comprising a reflective sheet body and a lug arranged on at least one side of the reflective sheet body, said lug protruding outwardly of the reflective sheet body along a length or a width direction of the reflective sheet body, a clamp slot corresponding to the lug being arranged on a side wall of the receiving part, and said lug being arranged within the clamp slot.

According to an embodiment, said lug may be formed integrally with the reflective sheet body.

According to another embodiment, said reflective sheet body may be arranged with said lugs on multiple sides thereof.

According to yet another embodiment, said frame may comprise a sealant frame and a back plate, the optical component being fixed to said sealant frame, and said sealant frame being fixed to said back plate, said clamp slot being arranged on a side wall of said sealant frame.

According to a further embodiment, said sealant frame may be provided with a protrusion on a surface thereof facing the back plate, said back plate being arranged with a groove corresponding to said protrusion, said protrusion being arranged within said groove.

According to an embodiment, said back plate may comprise a bottom plate as well as a first side plate, a second side plate, a third side plate and a fourth side plate connected in sequence, said reflective sheet being arranged on said bottom plate, said first side plate comprising a vertical part and a bended part that bends towards the optical component, a light bar being arranged between said optical component and said vertical part, the side wall of said sealant frame comprising a first side wall arranged on said bended part, a second side wall arranged inwardly at the second side plate, a third side wall arranged inwardly at the third side plate and a fourth side wall arranged inwardly at the fourth side plate, said clamp slot being arranged on the second, third and fourth side walls of the sealant frame.

According to another embodiment, said light bar may comprise a circuit board and a light emitting means arranged on the circuit board, said circuit board being arranged on said bottom plate.

The second aspect of this disclosure also provides a liquid crystal module, said liquid crystal module comprising the backlight provided by the first aspect.

According to an embodiment, said frame may comprise a sealant frame for fixing said optical component, said sealant frame comprising a carrying part arranged on a side wall of said sealant frame, said liquid crystal module further comprising a liquid crystal panel, said liquid crystal panel being arranged on said carrying part.

The third aspect of this disclosure provides also a display device comprising the backlight provided by the first aspect of this disclosure or the liquid crystal module provided by the second aspect of this disclosure.

In this disclosure, the lug on the reflective sheet body is arranged within the clamp slot on the side wall of the receiving part. Such clamping method is more favorable to the assembling of the backlight as compared to the prior art fixation of the reflective sheet using a double-sided adhesive and has not the problem of aligned attachment; further, during repair and maintenance, it avoids the damage to the reflective sheet caused by tearing double-sided adhesive and avoids waste of the double-sided adhesive, thereby reducing the manufacturing cost.

BRIEF DESCRIPTION OF THE DRAWINGS

The accompanying drawings are used for providing further understanding of this disclosure and constitute a part of the description for explaining, together with the following embodiments, this disclosure, but not a limitation thereto. In the drawings.

Therein, the reference signs are: 1. reflective sheet; 11. reflective sheet body; 12. lug; 2. double-sided adhesive; 3. circuit board; 4. clamp slot; 5. sealant frame; 50. carrying part; 51. first side wall; 52. second side wall; 53. third side wall; 54. fourth side wall; 6. back plate; 61. first side plate; 61a. vertical part; 61b. bended part; 62. second side plate; 63. third side plate; 64. fourth side plate; 65. bottom plate; 7. light emitting means; 8. light guide plate; 9. liquid crystal panel.

DETAILED DESCRIPTION

The specific embodiments of this disclosure are described in detail as follows in conjunction with the accompanying drawings. It should be understood that the described embodiments here are used only for illustrating and explaining this disclosure, rather than limiting this disclosure.

Figure 1:
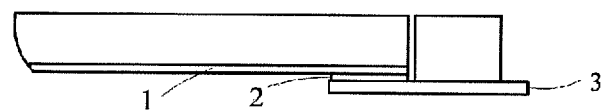
FIG. 1 is a schematic diagram of a fixation of the reflective sheet in the prior art.
Figure 2:
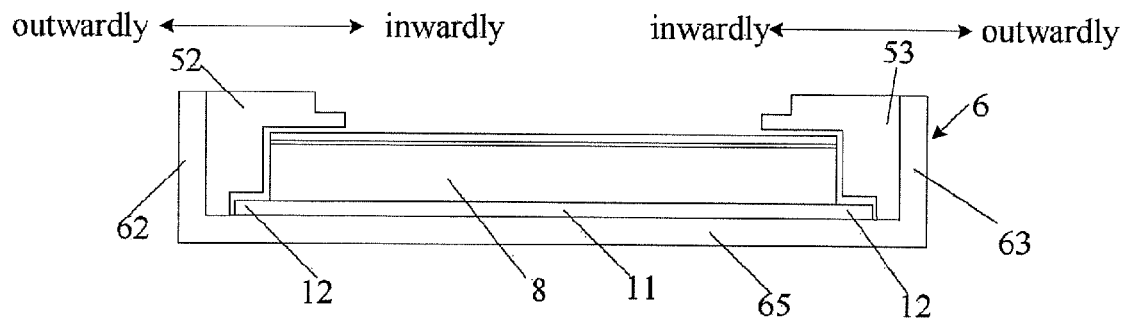
FIG. 2 is a schematic sectional view of a backlight according to an embodiment of this disclosure.

As one aspect of this disclosure, a backlight is provided. As shown in FIG. 2, the backlight comprises an optical component and a frame that comprises a receiving part, and the optical component is disposed within the receiving part. The optical component comprises a reflective sheet 1 that reflects light towards a light exit of the backlight. The reflective sheet 1 comprises a reflective sheet body 11 and a lug 12 arranged on at least one side of the reflective sheet body 11. The lug 12 protrudes outwardly of the reflective sheet body 11 along a length or a width direction of the reflective sheet body 11. A clamp slot corresponding to the lug 12 is arranged on a side wall of the receiving part, and the lug 12 is arranged within the clamp slot.

When a side or both sides of the reflective sheet body 11 in the length direction is/are arranged with the lug 12, the lug 12 protrudes outwardly of the reflective sheet body 11 along the length direction of the reflective sheet body 11; when a side or both sides of the reflective sheet body 11 in the width direction is/are arranged with the lug 12, the lug 12 protrudes outwardly of the reflective sheet body 11 along the width direction of the reflective sheet body 11.

Compared to a fixation of the reflective sheet using a double-sided adhesive in the prior art, in this disclosure, the lug 12 on the reflective sheet body 11 is arranged within a clamp slot on a side wall of the receiving part. Such clamping method is more favorable to the assembling of the backlight and has not the problem of aligned attachment; further, during repair and maintenance, it avoids the damage to the reflective sheet 1 caused by tearing double-sided adhesive and avoids waste of the double-sided adhesive, thereby reducing the manufacturing cost.

The lug 12 can be fixed to an edge of the reflective sheet body 11 using an adhering agent or other fixation methods after being independently manufactured; However, in order to enhance the fixation effect of the reflective sheet and simplify the production process, the lug 12 and the reflective sheet body 11 are formed integrally.

Figure 4:
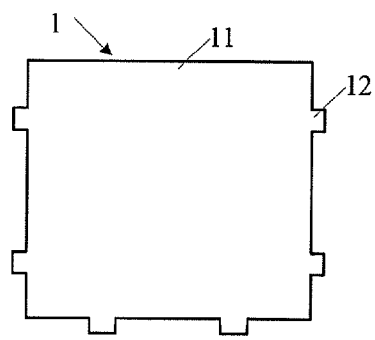
FIG. 4 is a structure schematic diagram of a reflective sheet according to an embodiment of this disclosure.

This disclosure sets no specific limit on the position of the lug 12; however, in order to enhance the fixation effect of the reflective sheet 1, according to an embodiment, multiple sides of the reflective sheet body 11 are arranged with lugs. In particular, as shown in FIG. 4, three sides of the reflective sheet body 11 are arranged with lugs 12. In addition, this disclosure sets no specific limit on the number and shape of the lugs 12, with only the condition that they can perform the fixing function for the reflective sheet 1 by extending into a corresponding clamp slot.

Figure 5:
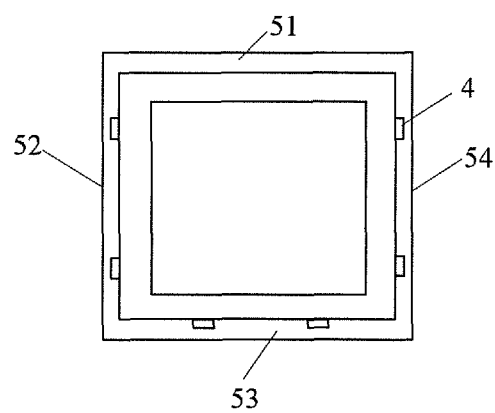
FIG. 5 is a bottom view of a sealant frame according to an embodiment of this disclosure.

In some examples, the frame comprises a sealant frame 5 and a back plate 6. The optical component is fixed to the sealant frame 5, and the sealant frame 5 is fixed to the back plate 6. The sealant frame 5 may comprise side walls 51-54 arranged around the optical component, and the slot 4 is arranged on a side wall of the sealant frame 5 (as shown in FIG. 5). The back plate 6 may comprise a side plate arranged at a periphery of the sealant frame 5 and a bottom plate arranged below the optical component.

Specifically, in order to maintain the fixed connection between the sealant frame 5 and the back plate 6, the sealant frame 5 can be arranged with a protrusion on a surface thereof facing the back plate 6 on which a groove that corresponds to the protrusion is arranged, and the protrusion is arranged within the groove (not shown), such that the sealant frame 5 and the back plate 6 are maintained stable.

Figure 3:
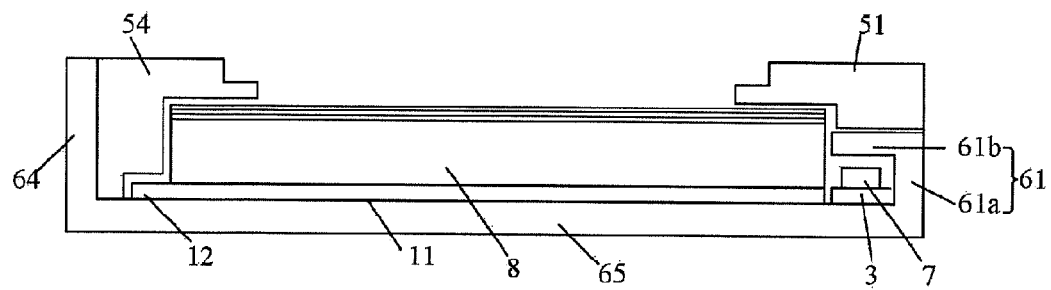
FIG. 3 is a schematic sectional view of the backlight perpendicular to the sectional view shown in FIG. 2.

Further, as shown in FIG. 2 and FIG. 3, the back plate 6 comprises a bottom plate 65 as well as a first side plate 61, a second side plate 62, a third side plate 63 and a fourth side plate 64 connected in sequence. The reflective sheet 1 is arranged on the bottom plate 65. The first side plate 61 comprises a vertical part 61a and a bended part 61b that bends towards the optical component. A light bar is arranged between the optical component and the vertical part 61a. The side walls of the sealant frame 5 may specifically comprise a first side wall 51 arranged on the bended part 61b, a second side wall 52 arranged inwardly at the second side plate 62, a third side wall 53 arranged inwardly at the third side plate 63 and a fourth side wall 54 arranged inwardly at the fourth side plate 64. The clamp slot 4 is arranged on the second side wall 52, the third side wall 53 and the fourth side wall 54 of the sealant frame 5 (as shown in FIG. 5). The term "inwardly" as used in this disclosure refers to a direction facing the optical component and "outwardly" to a direction facing away from the optical component, as shown by the arrow in FIG. 2.

The sealant frame 5 is arranged with a protrusion on a surface thereof facing the back plate 6, i.e. a protrusion is arranged on a surface of the second side wall 52 that faces the second side plate 62, a protrusion is arranged on a surface of the third side wall 53 that faces the third side plate 63, and a protrusion is arranged on a surface of the fourth side wall 54 that faces the fourth side plate 64. Since the first side wall 51 is arranged on the bended part 61b, a protrusion may be arranged on a lower surface of the first side wall 51 that faces the bended part 61, and of course, the first side wall 51 and the bended part 61b may also be fixed via adherence by an adhering agent therebetween.

As shown in FIG. 2, the light bar may specifically comprise a circuit board 3 and a light emitting means 7 arranged on the circuit board 3, e.g. a light emitting diode. The circuit board 3 may be arranged either on the vertical part 61a of the back plate 6 or on the bottom plate 65 of the back plate 6. It may be understood that for small-sized display devices such as a cell phone, a tablet computer, etc., the requirement for the brightness of display is relatively low, and accordingly, the light guide plate as used has a relatively small thickness and the backlight has a relatively small thickness, too. Thus, when the backlight is applied to a small-sized display device, the circuit board 3 of the light bar is arranged on the back plate 65, as shown in FIG. 3, i.e. the light emitting means 7 may be an side-lit light emitting diode, thereby reducing the thickness of the backlight.

When the light bar is arranged on the bottom plate 65 of the back plate 6, compared to adhering the reflective sheet 1 to the circuit board 3 via a double-sided adhesive in the prior art, this disclosure realizes the fixation of the reflective sheet 1 by a clamping of the lug 12 and the clamp slot 4, of which the advantageous effects lie also in that it avoids the shielding of light from the light emitting means 7 by the double-sided adhesive and enhances the light utilization.

As shown in FIG. 2 and FIG. 3, the optical component may also comprise a light guide plate 8 arranged on a reflecting surface of the reflective sheet 1. The light emitting means 7 corresponds to a light incidence surface of the light guide plate 8, and the light emitting means 7 emits light towards the light incidence surface of the light guide plate 8. The light guiding function of the light guide plate 8 converts the point light sources of the light emitting means 7 into an area light source, whereas the light leaked from the bottom surface of the light guide plate 8 may be reflected via the reflective sheet 1 towards an exit of the backlight.

The backlight may also comprise optical film sheets, such as a diffusion sheet, a lens sheet, etc. (not shown), arranged on a light exit surface of the light guide plate 8, to further diffuse the light emitted by the light guide plate 8 and refract the light from different directions by different angles, such that the light of the backlight is more homogenous and higher in brightness.

The description above is about a backlight provided by this disclosure, from which it can be seen that the lug arranged on the reflective sheet body is located within the clamp slot on the sealant frame, where fixation of the reflective sheet is achieved by a clamping of the lug and the clamp slot, accordingly which no such problem as an inconvenient alignment is present as was in a fixation of the reflective sheet using double-sided adhesive. Moreover, during repair and maintenance, disassembling of the reflective sheet may be easily implemented avoiding the damage to the reflective sheet caused by tearing double-sided adhesive and reducing the waste of the production material as well as reducing the cost of manufacturing.

As another aspect of this disclosure, a liquid crystal module is provided, which comprises the aforesaid backlight provided by this disclosure.

Figure 6:
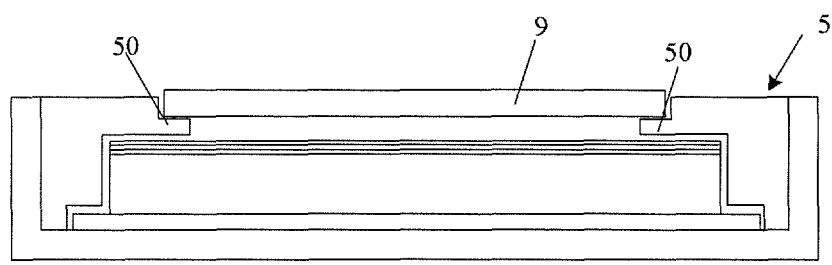
FIG. 6 is a structure schematic diagram of a liquid crystal module according to an embodiment of this disclosure.

The frame of the backlight comprises a sealant frame 5 for fixing the optical component. As shown in FIG. 6, the sealant frame 5 comprises a carrying part 50 arranged on a side wall of the sealant frame. The liquid crystal module further comprises a liquid crystal panel 9, and the liquid crystal panel 9 is arranged on the carrying part 50.

Since the backlight in this disclosure can facilitate the disassembling of the reflective sheet and reduce the damage to the reflective sheet during the disassembling, the liquid crystal module of this disclosure can also facilitate the repair and maintenance and reduce the waste of the material.

As a further aspect of this disclosure, a display device is also provided by this disclosure, which comprises the aforesaid backlight or liquid crystal module provided by this disclosure. Since the backlight in this disclosure can facilitate the disassembling of the reflective sheet and reduce the damage on the reflective sheet during the disassembling, the display device of this disclosure can also facilitate the repair and maintenance and reduce the waste of the material.

It may be understood that the above embodiments are only exemplary embodiments used for illustrating the principles of this disclosure, whereas this disclosure is not limited to these embodiments. For those ordinarily skilled in the art, various modifications and improvements can be made without departing from the spirit and the essence of this disclosure, while these modifications and improvements are also considered within the scope of this disclosure.

The invention claimed is:

1. A backlight comprising:
a light exit;
a frame comprising:
  a receiving part; and
  a clamp slot arranged in a side wall of the receiving part; and
an optical component disposed within the receiving part comprising a reflective sheet for reflecting light toward the light exit, the reflective sheet comprising:
  a reflective sheet body; and
  a lug arranged on at least one side of the reflective sheet body;
  wherein the lug protrudes outwardly of the reflective sheet body at least one of a length direction and a width direction of the reflective sheet body; and
  wherein the lug is arranged within the clamp slot;
wherein:
  the frame comprises:
    a sealant frame; and
    a back plate;
  the optical component is fixedly attached to the sealant frame;
  the sealant frame is fixedly attached to the back plate; and
  the clamp slot is arranged on a side wall of the sealant frame.

2. The backlight according to claim 1, wherein said lug is formed integrally with the reflective sheet body.

3. The backlight according to claim 1, wherein the reflective sheet comprises a lug arranged on at least two sides of the reflective sheet body.

4. The backlight according to claim 1, wherein:
said sealant frame is provided with a protrusion on a surface thereof facing the back plate;
said back plate is arranged with a groove corresponding to said protrusion; and
said protrusion is arranged within said groove.

5. The backlight according to claim 1, wherein the back plate comprises:
a bottom plate; and
a first side plate, a second side plate, a third side plate, and a fourth side plate that are connected in sequence;
wherein the reflective sheet of the optical component is arranged on the bottom plate;
wherein the first side plate comprises a vertical portion and a bent portion that is bent toward the optical component;
a light bar arranged between said optical component and said vertical portion of the first side plate;
wherein the sealant frame comprises:
  a first side wall arranged on the bent portion of the first side plate;
  a second side wall arranged inward of the second side plate;
  a third side wall arranged inward of the third side plate; and
  a fourth side wall arranged inward of the fourth side plate;

wherein the clamp slot is arranged on each of the second side wall, the third side wall, and the fourth side wall of the sealant frame.

6. The backlight according to claim 5, wherein:
said light bar comprises a circuit board and a light emitting means arranged on the circuit board; and
said circuit board is arranged on said bottom plate.

7. A liquid crystal module comprising:
a liquid crystal panel; and
a backlight comprising:
  a light exit;
  a frame comprising:
    a receiving part; and
    a clamp slot arranged in a side wall of the receiving part; and
  an optical component disposed within the receiving part comprising a reflective sheet for reflecting light toward the light exit, the reflective sheet comprising:
    a reflective sheet body; and
    a lug arranged on at least one side of the reflective sheet body;
    wherein the lug protrudes outwardly of the reflective sheet body at least one of a length direction and a width direction of the reflective sheet body; and
    wherein the lug is arranged within the clamp slot;
  wherein the frame comprises a sealant frame for fixing the optical component;
  the sealant frame comprising a carrying part arranged on a side wall of said sealant frame; and
  the liquid crystal panel is arranged on the carrying part.

8. A display device comprising at least one of:
a backlight comprising:
  a light exit;
  a frame comprising:
    a receiving part; and
    a clamp slot arranged in a side wall of the receiving part; and
  an optical component disposed within the receiving part comprising a reflective sheet for reflecting light toward the light exit, the reflective sheet comprising:
    a reflective sheet body; and
    a lug arranged on at least one side of the reflective sheet body;
    wherein the lug protrudes outwardly of the reflective sheet body at least one of a length direction and a width direction of the reflective sheet body; and
    wherein the lug is arranged within the clamp slot; and
a liquid crystal module;
wherein:
  the frame comprises:
    a sealant frame; and
    a back plate;
  the optical component is fixedly attached to the sealant frame;
  the sealant frame is fixedly attached to the back plate; and
  the clamp slot is arranged on a side wall of the sealant frame.

* * * * *